United States Patent
Chen et al.

(10) Patent No.: US 6,374,235 B1
(45) Date of Patent: Apr. 16, 2002

(54) METHOD, SYSTEM, AND PROGRAM FOR A JOIN OPERATION ON A MULTI-COLUMN TABLE AND SATELLITE TABLES INCLUDING DUPLICATE VALUES

(75) Inventors: Stephen Yao Ching Chen, Saratoga; Patrick Michael Malone, San Jose; Jerry Mukai, San Jose; Jeffrey Ralph Ruggles, San Jose; Desai Paramesh Sampatrai, San Jose; Yun Wang, Saratoga; Guogen Zhang, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,731

(22) Filed: Jun. 25, 1999

(51) Int. Cl.⁷ .............................................. G06F 17/30
(52) U.S. Cl. ................................. 707/2; 707/3; 707/4
(58) Field of Search .................................... 707/2, 3, 4

(56) References Cited

U.S. PATENT DOCUMENTS

| | | | |
|---|---|---|---|
| 5,043,872 A | 8/1991 | Cheng et al. .................. | 707/2 |
| 5,301,317 A | 4/1994 | Lohman et al. ................ | 707/2 |
| 5,345,585 A | 9/1994 | Iyer et al. ..................... | 707/2 |
| 5,367,675 A | 11/1994 | Cheng et al. .................. | 707/2 |
| 5,423,035 A | 6/1995 | DePrez .......................... | 707/2 |
| 5,469,568 A | 11/1995 | Schiefer et al. ................ | 707/2 |
| 5,546,576 A | 8/1996 | Cochrane et al. .............. | 707/2 |
| 5,548,754 A | 8/1996 | Pirahesh et al. ............... | 707/2 |
| 5,548,755 A | 8/1996 | Leung et al. .................. | 707/2 |
| 5,548,758 A | 8/1996 | Pirahesh et al. ............... | 707/2 |
| 5,615,361 A | 3/1997 | Leung et al. .................. | 707/3 |
| 5,630,120 A | 5/1997 | Vachey ......................... | 707/2 |
| 5,671,403 A | 9/1997 | Shekita et al. ................. | 707/3 |

(List continued on next page.)

FOREIGN PATENT DOCUMENTS

EP 0875838 4/1998

OTHER PUBLICATIONS

An efficient hybrid join algorithm: a DB2 prototype by Chen J., et al. Data Engineering, 1999, Proc. 7th Inter. Conf., pp. 171–180.*

IBM Technical Disclosure Bulletin, "Fast Table Joining In Relational Data Bases and Fast Row Retrieval", vol. 30, No. 2, Jul. 1987, pp. 750–757.

Arun Swami, "Optimization of Large Join Queries: Combining Heuristics and Combinational Techniques", ACM, 1989, pp. 367–376.

(List continued on next page.)

*Primary Examiner*—Diane D. Mizrahi
(74) *Attorney, Agent, or Firm*—David W. Victor; Konrad Raynes Victor & Mann LLP

(57) ABSTRACT

Disclosed is a method, system, and program for performing a join operation on a multi-column table and at least two satellite tables having a join condition. Each satellite table is comprised of multiple rows and at least one join column. The multi-column table is comprised of multiple rows and at least one column corresponding to the join column in each satellite table. A join operation is performed on the rows of the satellite tables to generate concatenated rows of the satellite tables. One of the concatenated rows is joined to the multi-column table and a returned entry from the multi-column table is received. A determination is then made as to whether the returned entry matches the search criteria. If so, a determination is made as to whether one of the satellite tables has duplicates of values in the join column of the returned matching entry or the multi-column table has duplicate entries in the join columns. Returned matching entries are generated for each duplicate value in the satellite tables and duplicate entry in the multi-column table.

27 Claims, 7 Drawing Sheets

U.S. PATENT DOCUMENTS

| | | | |
|---|---|---|---|
| 5,680,603 A | 10/1997 | Bhargava et al. | 707/2 |
| 5,701,455 A | 12/1997 | Bhargava et al. | 707/2 |
| 5,706,494 A | 1/1998 | Cochrane et al. | 707/2 |
| 5,706,495 A | 1/1998 | Chadha et al. | 707/2 |
| 5,724,568 A | 3/1998 | Bhargava et al. | 707/4 |
| 5,734,893 A | 3/1998 | Li et al. | 707/2 |
| 5,758,146 A | 5/1998 | Schiefer et al. | 707/2 |
| 5,758,335 A | 5/1998 | Gray | 707/4 |
| 5,761,657 A | 6/1998 | Hoang | 707/4 |
| 5,765,159 A | 6/1998 | Srinivasan | 707/102 |
| 5,799,309 A | 8/1998 | Srinivasan | 707/102 |
| 5,822,750 A | 10/1998 | Jou et al. | 707/2 |
| 5,848,408 A | 12/1998 | Jakobsson et al. | 707/3 |
| 5,873,075 A | 2/1999 | Cochrane et al. | 707/2 |
| 5,873,083 A | 2/1999 | Jones et al. | 707/4 |
| 5,905,985 A | 5/1999 | Malloy et al. | 707/100 |
| 5,930,785 A * | 7/1999 | Lohman et al. | 707/2 |
| 6,029,163 A * | 2/2000 | Ziauddin | 707/3 |
| 6,105,018 A * | 8/2000 | Demers et al. | 707/2 |
| 6,272,487 B1 * | 8/2001 | Beavin et al. | 707/2 |
| 6,285,997 B1 * | 9/2001 | Carey et al. | 707/4 |
| 6,289,334 B1 * | 9/2001 | Reiner et al. | 707/3 |

OTHER PUBLICATIONS

Disclosed Anonymously, "Building of All Data Objects Prior to Threaded Code Generation", Research Disclosure, Apr. 1989, No. 300, Kenneth Mason Publications Ltd, England.

IBM Technical Disclosure Bulletin, "Searching For Documents Within A Specified Nesting Level of Folders", vol. 32, No. 5A, Oct. 1989, pp. 396–397.

IBM Technical Disclosure Bulletin, "Extensible Design For Generating Alternative Join Sequences in a Relational Query Optimizer", vol. 32, No. 11, Apr. 1990, pp. 317–318.

IBM Technical Disclosure Bulletin, "Implementations of Extended Relational Operations", vol. 34, No. 4A, Sep. 1991, pp. 340–354.

P. Mishra, et al, "Join Processing in Relational Databases", ACM Computing Surveys, vol. 24, No. 1, Mar. 1992, pp. 63–113.

"Star Schema Processing for Complex Queries", Red Brick Systems, Inc., 1998, pp. 1–18.

* cited by examiner

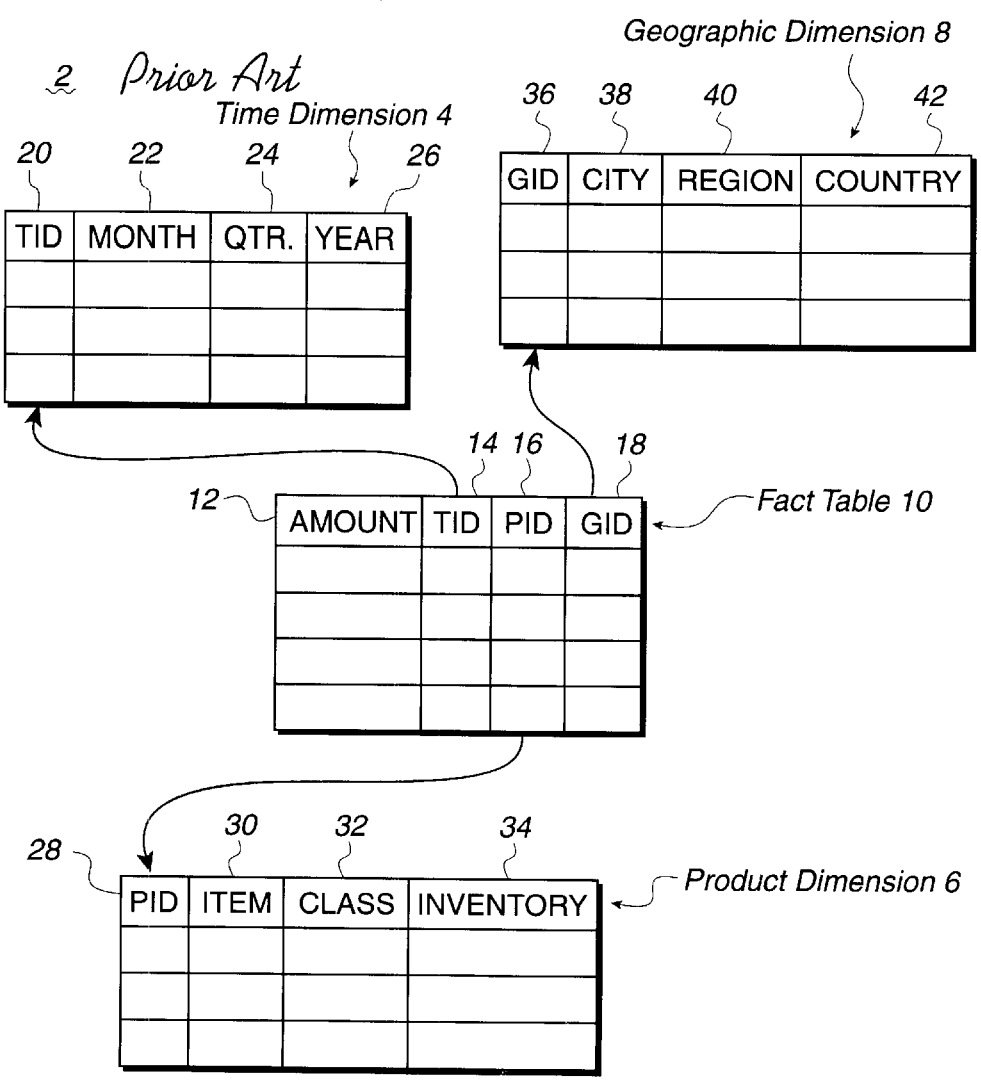

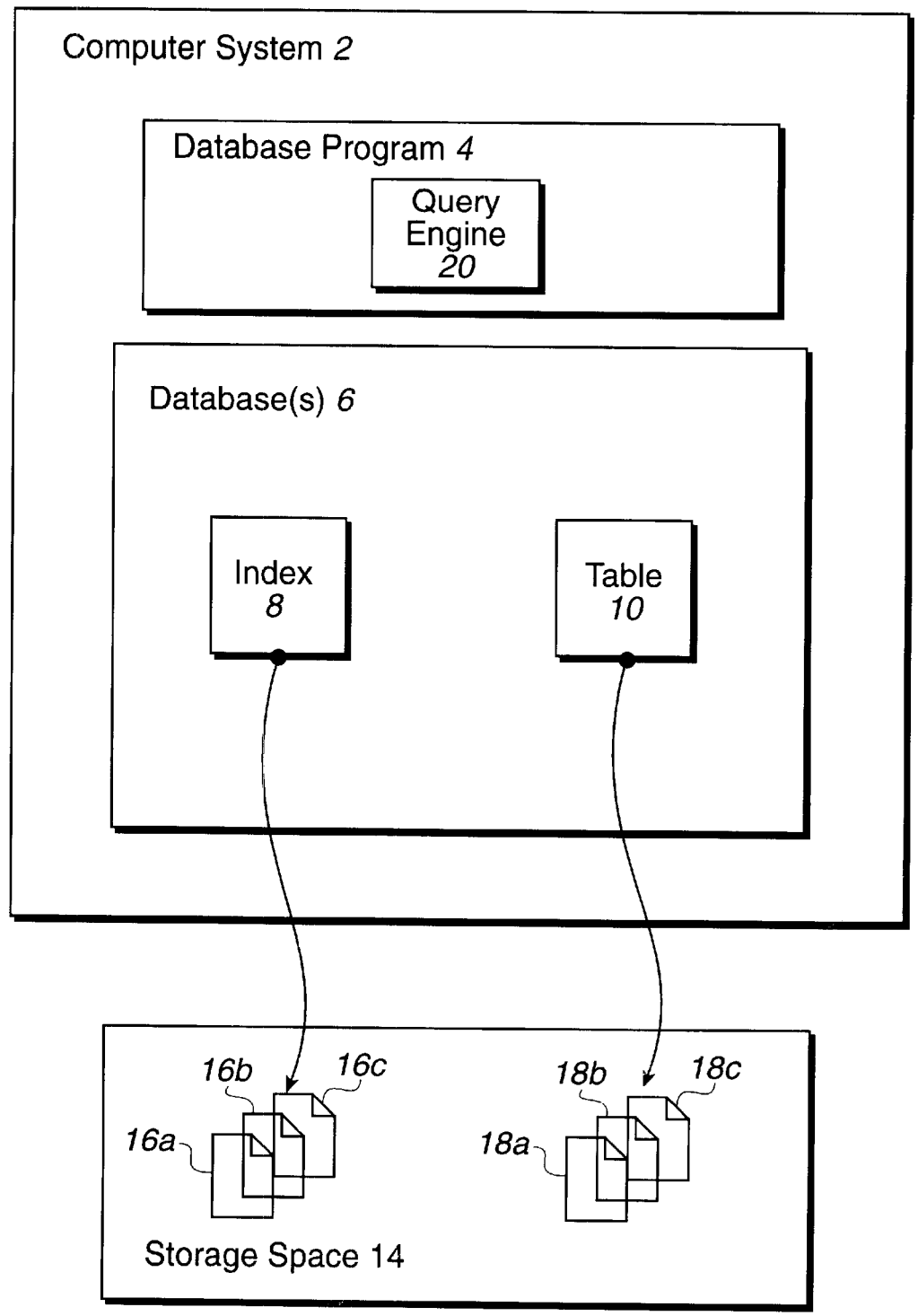

| Amount | TID | GID | PID |
|---|---|---|---|
| 30 | 1/31/97 | Chicago | Coat |
| 20 | 1/31/97 | Chicago | Detergent |
| 5 | 1/31/97 | Chicago | Hat |
| 3 | 1/31/97 | Chicago | Shirt |
| 12 | 1/31/97 | Chicago | Shoe |
| 13 | 1/31/97 | Detroit | Coat |
| 9 | 1/31/97 | Detroit | Detergent |
| 2 | 1/31/97 | Detroit | Shirt |
| 7 | 1/31/97 | Detroit | Shoe |
| 14 | 1/31/97 | San Jose, CA | Coat |
| 8 | 1/31/97 | San Jose, CA | Detergent |
| 6 | 1/31/97 | San Jose, CA | Hat |
| 32 | 1/31/97 | San Jose, CA | Hat |
| 2 | 1/31/97 | San Jose, CA | Shirt |
| 2 | 1/31/97 | San Jose, CA | Socks |
| | ... | ... | ... |
| 1 | 1/31/97 | San Simeon, CA | Detergent |
| | ... | ... | ... |

Fig. 4

METHOD, SYSTEM, AND PROGRAM FOR A JOIN OPERATION ON A MULTI-COLUMN TABLE AND SATELLITE TABLES INCLUDING DUPLICATE VALUES

CROSS-REFERENCE TO RELATED APPLICATIONS

This application is related to the following co-pending and commonly-assigned patent applications, all of which are filed on the same date herewith, and which are incorporated herein by reference in their entirety:

Method, System, and Program for Searching A List of Entries When Search Criteria Is Provided for less than All of the Fields in an Entry, to Tina Lee, Lee Chin Liu, Desai Paramesh Sampatrai, Hong S. Tie, S. Y. Wang, Yun Wang, having application Ser. No. 09/344,731 filed Jun. 25, 1999 (pending);

Method, System, and Program for Performing a Join Operation on a Multi-Column Table and Satellite Tables, to Stephen Yao Ching Chen, William Y. Kyu, Fen-Ling Lin, Desai Paramesh Sampatrai, and Yun Wang, having application Ser. No. 09/344,727 filed Jun. 25, 1999 (pending); and Method, System, and Program for Determining the Join Ordering of Tables in a Join Query, to Lee-Chin Hsu Liu, Hong Sang Tie, Shyh-Yee Wang, and Yun Wang, having application Ser. No. 09/340,352 filed Jun. 25, 1999 (pending).

BACKGROUND OF THE INVENTION

1. Field of the Invention

The present invention relates to a method, system, and program for performing a join operation on a multi-column table and satellite tables with a join condition and, in particular, joining multiple dimension tables with a fact table in a star join.

2. Description of the Related Art

Data records in a computerized relational database management system (RDBMS) are maintained in tables, which are a collection of rows all having the same columns. Each column maintains information on a particular type of data for the data records which comprise the rows. One or more indexes may be associated with each table. An index is an ordered set of pointers to data records in the table based on the data in one or more columns of the table. In some cases, all the information needed by a query may be found in the index, making it unnecessary to search the actual table. An index is comprised of rows or index entries which include an index key and a pointer to a database record in the table having the key column values of the index entry key. An index key is comprised of key columns that provide an ordering to records in a table. The index key columns are comprised of the columns of the table, and may include any of the values that are possible for that particular column. Columns that are used frequently to access a table may be used as key columns.

Organizations may archive data in a data warehouse, which is a collection of data designed to support management decision making. Data warehouses contain a wide variety of data that present a coherent picture of business conditions at a single point in time. One data warehouse design implementation is known as star schema or multidimensional modeling. The basic premise of star schemas is that information is classified into two groups, facts and dimensions. A fact table comprises the main data base records concerning the organization's key transactions, such as sales data, purchase data, investment returns, etc. Dimensions are tables that maintain attributes about the data in the fact table. Each dimension table has a primary key column that corresponds to a foreign key column in the fact table. Typically, the fact table is much larger than the related dimension tables.

The fact table typically comprises numerical facts, such as the date of a sale, cost, type of product sold, location, site of sale, etc. The dimension table usually provides descriptive textual information providing attributes on one of the fact table columns. For instance, a time dimension table can provide attributes on the date column in the fact table describing the date of sale. The time dimension table may provide various weather conditions or events that occurred on particular dates. Thus, the time dimension table provides attributes on the time, i.e., weather, important events, etc., about data columns in the fact table.

The star schema provides a view of the database on dimension attributes that are useful for analysis purposes. This allows users to query on attributes in the dimension tables to locate records in the fact table. A query would qualify rows in the dimension tables that satisfy certain attributes or join conditions. The qualifying rows of the dimension tables have primary keys that correspond to foreign keys in the fact table. A join operation, such as an equijoin or natural join, is then performed on the qualifying rows of the joined dimension tables and the fact table. This join results in returning fact table entries that match the rows of the joined dimension tables, i.e., fact table entries that satisfy the search criteria on the dimension tables. Thus, join operations are used to query a fact table on dimension table attributes.

A join operation combines or concatenates the rows from the different dimension tables according to a condition or predicate to determine values to apply against the fact table. This is distinguished from a Cartesian product which concatenates every row from one table with every other row from another table without regard to a condition or predicate to exclude rows from the result. Rows from the tables involved in a join operation that do not satisfy the predicate or condition are excluded from the join result. Because the dimension tables are unrelated, the rows of the dimension tables that satisfy the join condition are then concatenated in every possible combination.

The Cartesian product of the rows of the dimension tables provides a data view of the entire space, i.e., Cartesian space, of every possible combination of the possible dimension table values. The join result, on the other hand, is a subset of the Cartesian space that is limited to those Cartesian space points that satisfy the join or search condition. One common type of join operation is an equijoin. An equijoin combines two rows from different tables that are equal according to some attribute. Once the combination of all dimension table rows that satisfy the search criteria is produced, the resulting rows are then applied to the Fact table in an equijoin operation to locate those rows in the fact table that have the same values as the rows resulting from the join on the dimension tables. Typically, the primary key columns of the dimension tables in the join result are compared against the corresponding foreign key columns in the Fact table to produce the equijoin results.

In multi-dimensional analysis, it is often desirable to form a query on the attributes specified in the dimension tables and then locate all records in the fact table that satisfy the criteria on the dimension table attributes. To perform such a query, the query engine joins the dimension tables on the conditions specified in the search criteria. The query engine then equijoins the dimension tables with the fact table to produce join results that satisfy the join condition.

The above query technique using join operations is very inefficient because the results of the join operation on the dimension tables may produce numerous concatenations that do not exist in the fact table. In fact, it has been found that on average only 1% or less of the concatenated results of the join operation on the dimension tables have corresponding matching entries in the Fact table that would concatenate in an equijoin operation. Nonetheless, prior art techniques would attempt to join all of the join results from the dimension tables to the fact table even though many of these attempted joins would not produce results as less than 1% of the concatenated results of the dimension table joins have corresponding matches in the fact table. Thus, numerous join operations are performed for which there will be no join result, thereby needlessly consuming I/O operations to perform the non-matching join operations.

FIG. 1 illustrates an example of a star schema 2 with multiple dimension tables 4, 6, and 8 and a fact table 10. The fact table 10 includes sales data, wherein each record includes information on the amount sold in the AMOUNT column 12; the time of sale in the TID column 14, which includes a time identifier; the product sold in the PID column 16 which is a product identifier; and the location of the sale, e.g., store location, in the GID column 18, which is a geographic identifier. The dimension tables 4, 6, and 8 provide attributes on the TID 14, PID 16, and GID 18 columns in the fact table.

The primary key columns of each of the dimension tables 4, 6, 8 are the TID column 20, PID column 28, and GID column 36, respectively. The columns 14, 16, and 18 in the fact table 10 are foreign keys that correspond to primary keys 20, 28, and 36 of the dimension tables 4, 6, 8 that provide attributes on the data in the fact table 10. For instance dimension table 4 provides attributes for each possible TID value, including month information in column 22, quarter of the TID in the quarter column 24, and the year of the TID in the year column 26. Dimension table 6 provides product attributes for each PID value, including the product item in item column 30, the class of the product in the class column 32, and the inventory location of the product in inventory column 34. The dimension table 8 provides attributes for each possible GID value, including the city of the GID in the city column 38, the geographical region in the region column 40, and the country in the country column 42.

To locate records in the fact table 10 with a query on the attributes of multiple dimension tables 4, 6, and 8, the query engine would first join the dimension tables 4, 6, and 8 according to conditions specified on the search criteria of the query. The results of the join of the dimension tables would be equijoined with the Fact table to find rows in the fact table 10 that match the attributes in the rows of the joined dimension table on time 4, product 6, and geographic location 8. The number of comparisons of the rows formed from the joined dimension tables could require a vast magnitude of calculations. For instance, if the dimension table values that satisfied the search criteria included 60 time values, 50,000 product values, and 1,000 geographical locations, then the concatenation of these rows in a join operation would produce 3 billion possible values to apply against the fact table 10 in an equijoin, even though likely only 1% of the entries in the fact table 10 would be concatenated in an equijoin.

There is thus a need in the art for an improved method for performing star join queries on multiple dimension tables.

SUMMARY OF THE PREFERRED EMBODIMENTS

To overcome the limitations in the prior art described above, preferred embodiments disclose a method, system, and program for performing a join operation on a multi-column table and at least two satellite tables having a join condition. Each satellite table is comprised of multiple rows and at least one join column. The multi-column table is comprised of multiple rows and at least one column corresponding to the join column in each satellite table. A join operation is performed on the rows of the satellite tables to generate concatenated rows of the satellite tables. One of the concatenated rows is joined to the multi-column table and a returned entry from the multi-column table is received. A determination is then made as to whether the returned entry matches the search criteria. If so, a determination is made as to whether one of the satellite tables has duplicates of values in the join column of the returned matching entry or the multi-column table has duplicate entries in the join columns. Returned matching entries are generated for each duplicate value in the satellite tables and duplicate entry in the multi-column table.

In further embodiments, determining whether the satellite table and multi-column table have duplicate values and entries and generating the returned matching entries comprises determining the satellite tables including join columns and a number of matching values for the join column in the returned matching entry. A number of instances of the returned matching entry in the multi-column table is then determined. A further determination is made of all possible combinations of the number of matching entries in the multi-column table and the matching values in each satellite table. The matching entry is returned for each possible combination of the matching entries and matching values.

In still further embodiments, determining all the possible combinations comprises generating at least one nested loop to iterate through the matching values in each determined satellite table and all the matching entries in the multi-column table. The matching entries are returned for each iteration of each of the nested loops.

Still further, the multi-column table may be the outermost table in the nested loop with respect to all the matching values of the satellite tables. Alternatively, the multi-column table may be an inner table with respect to at least one satellite table in the nested loops.

With preferred embodiments, reposition logic may be used to skip values in the space defined by the concatenation of the dimension tables even in the case where the dimension tables include duplicate values. In the case where the dimension tables include duplicate values, additional instances of the matching table entry are returned for the additional instances of the value in the dimension table. Without this logic to specifically process duplicate values in the dimension tables, matching table entries would not be returned for the duplicate values.

BRIEF DESCRIPTION OF THE DRAWINGS

Referring now to the drawings in which like reference numbers represent corresponding parts throughout:

FIG. 1 illustrates the arrangement of database tables in a star schema in a manner known in the art;

FIG. 2 illustrates a computing environment in which preferred embodiments are implemented;

FIG. 4 is an example of a table on which the join operations may be performed in accordance with preferred embodiments of the present invention.

DETAILED DESCRIPTION OF THE PREFERRED EMBODIMENTS

Figure 3A:
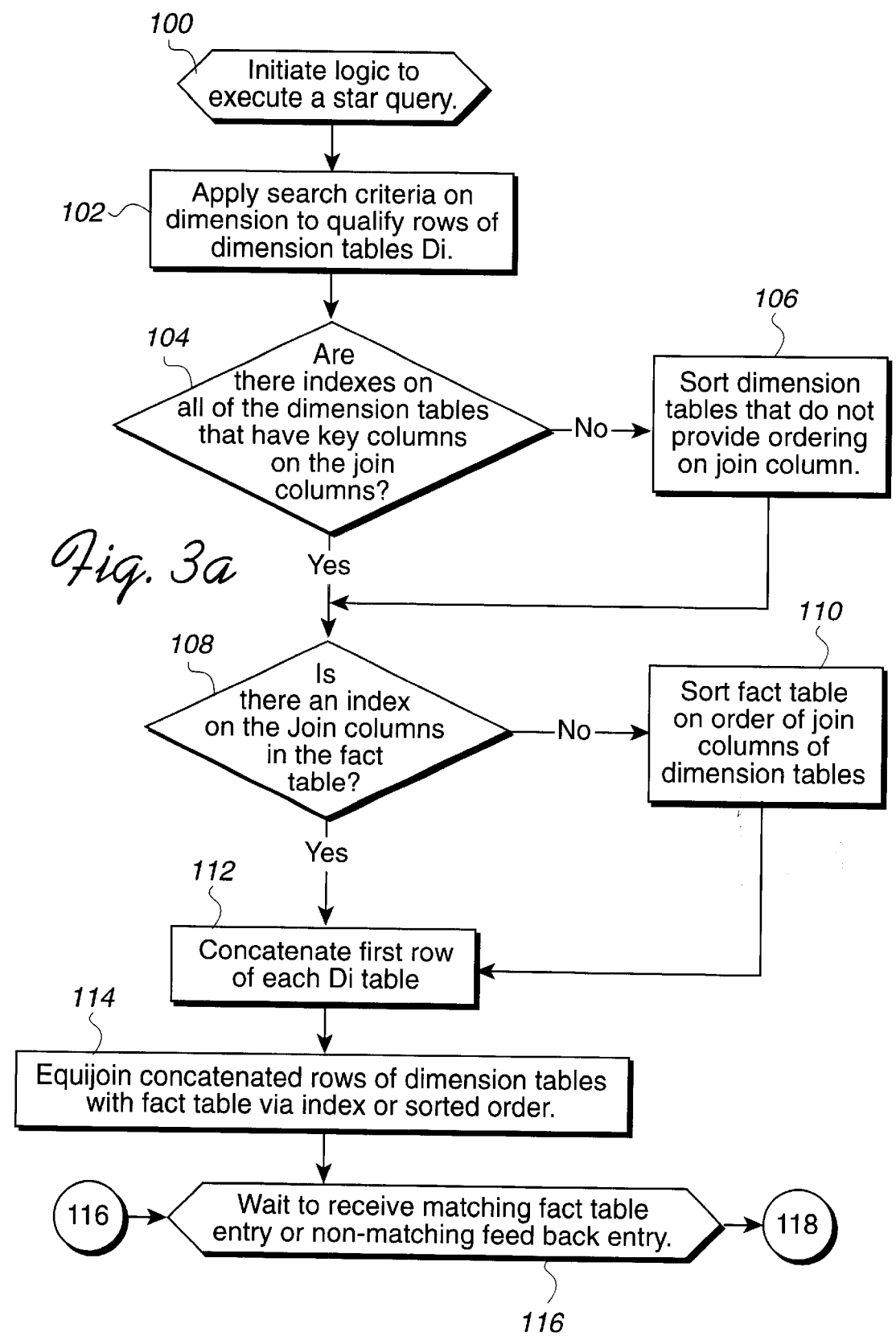
FIGS. 3a, b illustrate logic to join tables in accordance with preferred embodiments of the present invention.

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

FIG. 2 illustrates a computing environment in which a database may be implemented. A computer system 2, which may be a computer including an operating system such as MICROSOFT WINDOWS 98 and WINDOWS NT, AIX, OS/390, OS/2, MVS, etc., includes a database program 4, such as DB2, MICROSOFT Access, Oracle Corporation's ORACLE 8, etc. The database program 4 is used to access database information maintained in one or more databases 6. The database(s) 6 may consist of one or more indexes 8 and one or more tables 10. The indexes 8 provide an ordered set of pointers to data in the table 10 based on the data in one or more columns of the table. Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

**Microsoft, Windows, and Windows NT are registered trademarks of Microsoft Corporation; DB2, AIX, OS/390, and OS/2 are registered trademarks of IBM, MVS is a trademark of IBM; and Oracle8 is a trademark of Oracle Corporation.

A storage space 14 stores the actual data sets that include the data for the indexes and tables. The storage space 14 includes the pages 16a, b, c which contain the index entries for the index 8, such as the leaf pages when the index 8 is comprised of a B-tree. The storage space 14 further includes pages 18a, b, c of the records in the table 10. The storage space 14 may comprise a non-volatile storage space, such as a direct access storage device (DASD), which is comprised of numerous interconnected hard disk drives. Alternatively the storage space 14 may comprise storage pools within non-volatile memory, or a combination of non-volatile and volatile memories.

The database program 4 includes a query engine 20 that may receive a search request on attributes in dimension tables to locate records in a fact table. In such case, the search engine may join the multiple tables, using optimization techniques known in the art, to optimally determine the order of joining the tables for purposes of searching for matching values. The database 6 may further include a star schema or multi-dimensional table design, such as the star schema illustrated in FIG. 1. Further details of the implementation of a star schema in a database program, such as that shown in FIG. 2, are described in the commonly assigned patent entitled "Relational Database Modifications Based on Multi-Dimensional Database Modifications," U.S. Pat. No. 5,905,985, which patent is incorporated herein by reference in its entirety.

Searching a Fact Table for Matching Records

FIGS. 3a, b illustrate program logic implemented within a query optimizer of the query engine 20 to provide an improved technique for joining concatenated rows from the joined dimension tables 4, 6, 8 with the fact table 10. Control begins at block 100 when a query is initiated including search criteria on attributes of the dimension tables to locate records in the fact table. The query engine 20 would apply the search criteria or predicates (at block 102) to the dimension tables ($D_i$) to qualify only those rows in the dimension tables, e.g., TID 20, GID 36, PID 28, that satisfy the search criteria. The query engine 20 then determines (at block 104) whether there are indexes on all of the dimension tables, wherein the index has key columns on the join columns. If there are not indexes for all of the dimension tables, then the query engine 20 sorts (at block 106) those dimension tables on their join column, which is preferably the primary column. The query engine then determines (at block 108) whether there is an index on the join columns of the fact table. If not, then the query engine 20 sorts (at block 110) the fact table on the order of the join columns of the dimension table.

After insuring that the dimension tables and fact table are ordered on the join columns, the query engine 20 initiates the first join operation on the fact table by concatenating (at block 112) the first row of each of the dimension tables ($D_i$). The query engine then performs a multi-column equijoin (at block 114) of the concatenated rows of the dimension tables 4, 6, 8 with the multi-column fact table. This equijoin results in the return (at block 116) of the fact table entries that have join column values matching the values in the concatenated row from the results of the join on the dimension tables ($D_i$) that also satisfy the search criteria. Further, a feed back entry from the fact table 10 may be returned. The feed back entry is the entry in the fact table immediately following the matching entries or, if no matching entries, the entry that would follow such matching entries in the fact table, if they existed. The query engine 20 determines (at block 118) whether a feed back entry exists. If not, the program ends at block 122 as the entire fact table has been considered. Otherwise, the query engine 20 sets (at block 120) i equal to one, where there are i equals 1 to n dimension tables $D_i$.

The query engine 20 then determines (at block 124) whether the value in the ith join column, i.e., the ith column in the row formed by concatenating the dimension table entries, matches the value in the ith column in the feed back entry from the fact table. If so, the query engine 20 sets i=i+1 (at block 126) and then determines (at block 130) whether i<=n, i.e., there are more columns to consider. If there are more columns to consider, then the query engine 20 proceeds back to block 124 to consider the next (i+1)th column. Otherwise, if i>n, then all dimension columns $D_i$ have been considered, and the query engine 20 uses (at block 132) the feed back values for the next join operation (at block 114) as the feed back values match the concatenated entry. In such case, because the feed back entry matches the join columns, the query engine 20 performs the same join operation to locate any further matching entries in the fact table. If the ith join column does not match the ith feed back entry column, then the query engine 20 determines (at block 128) whether the value in the ith join column is less than the value in the ith column of the feed back entry according to the ordering in the ith dimension table $D_i$. If the value in the ith join column is less, then the query engine 20 increments the current ith join column value to the next value in the ith dimension table $D_i$. Otherwise, the query engine 20 sets (at block 136) the value for the (i+1) to nth columns or dimension tables to the first entry in those dimension tables. The query engine 20 then joins (at block 138) the newly determined join columns to the fact table and proceeds back to block 116. Any join columns not modified with the logic of blocks 124–138 remain unchanged from the value in the previous join operations.

If the ith join column value is less than the value in the ith column of the feed back entry, then the query engine 20 increments (at block 134) the current ith join column value to the next value in the ith dimension table $D_i$. From block 134, the query engine determines if the end of the nth dimension table is reached. If not, control transfers to block 124 to compare the incremented ith join column value to the feed back entry. Otherwise, if the end of the ith dimension table $D_i$ is reached, the query engine 20 determines (at block 142) whether i=1. If so, the program ends, otherwise, the query engine 20 sets i to i−1 and proceeds back to block 134 to determine if the previous (i−1)th dimension table will be used to determine the next concatenated row in the Cartesian space to use in the join operation.

The order of joining the dimension tables may be determined by the concatenation or ordering of the foreign keys in the fact table. For instance, with respect to the star schema 2 in FIG. 1, the rows of the dimension tables 4, 6, and 8 may be joined according to the ordering of the foreign keys 14, 16, and 18 in the fact table 10 that are primary keys 20, 28, and 36 in the dimension tables 4, 6, and 8, respectively. In other words, the joined keys having values for TID 20, PID 28, and GID 36 in the dimension tables 4, 6, 8 are the first, second and third dimensions used in the join to the fact table 10. As discussed, each of the dimensions, or dimension table primary keys 20, 28, and 36 has a range of possible ordered values. The related copending and commonly assigned patent application, entitled "Method, System, and Program for Determining the Join Ordering of Tables in a Join Query," having Ser. No. 09/340,352, ST9-99-053, which was incorporated herein by reference above, describes method for optimally determining the order of joining the dimension tables and fact table.

With the preferred logic of FIGS. 3a, b, the query engine 20 selects join column values to use in the next join operation based on feed back of the actual column entries in the fact table. Prior art techniques search the fact table for each possible point in the Join space of the dimension tables formed of the qualifying rows. Such prior art techniques may perform equijoin operations on the fact table for entries that do not exist. The preferred embodiments are advantageous over the prior art as the preferred embodiments may avoid numerous join operations using all the concatenations in the space defined by joining the dimension tables.

The advantages of the logic of FIGS. 3a, b can be shown with respect to the table 200 in FIG. 4. FIG. 4 illustrates possible values for the fact table 10 described in FIG. 1, with the ordering of the PID and GID columns reversed in the example. If there were 5,000 different possible PID values in the product dimension 6 and 500 different possible GID values in the geographic dimension 8, then a join on the dimensions for all products sold on a particular date, e.g., Jan. 31, 1997, would comprise the join product of rows in TID×PID×GID that satisfy the search criteria, which comprises 1×5,000×500 or 2,500,000 possible points in the Cartesian space defined by the join of the dimension table 4, 6, and 8 rows that satisfy the search criteria. Prior art search techniques would perform equijoins with the fact table 200 on each of these possible 2.5 million results of concatenating the dimension table rows even though the majority of these concatenated dimension table rows would not produce equijoin results, i.e., have no matching entries in the fact table 200.

For instance, if the query engine 20 joined (Jan. 31, 1997, Shoe, Chicago) to the fact table 200, the result would be table entry 202 and feed back entry (Jan. 31 1907, Coat, Detroit) 204. This feed back key would be used to determine the next concatenated row of the join on the dimension tables, thereby avoiding using concatenated rows having as join column values a TID of Jan. 31, 1997 and GID of Chicago and products after shoe that do not exist in the table 200 or any GID locations between Chicago and Detroit which also do not exist in the table 200. Further, upon receiving as feed back entry 206, the query engine 20 would generate the next join from the feed back entry 206. This logic would cause the query engine 20 to avoid using any dimension joins that include cities between Detroit and San Jose, for which there are no entries in the fact table 200. Thus, if there were 200 GID locations between San Jose and Detroit, the current art would generate 200×5000=1 million joins with the fact table using join column values between San Jose and Detroit for all products. Thus, the preferred logic would avoid performing 1 million searches as joining with non-existent entries in the fact table are minimized.

In further embodiments, the searches may be performed against a multi-column index on the fact table 10 including as columns the foreign keys in the fact table 10 that correspond to the primary keys in the dimension tables 4, 6, 8. For instance, a multi-column index for fact table 10 would comprise columns for the dimension primary keys, i.e., foreign keys, of TID, GID, and PID. The advantage of using a multi-column index on the fact table 10, is that there is no need to sort the large fact table, thus avoiding step 110 in FIG. 3a. Further, with a multi-column index, if all the dimensions are part of the join, then the performance related to the order in which the dimension tables are joined is not significantly affected by the ordering of the foreign keys in the multi-column index. Thus, the data base designer can design the multi-column index to optimize on the insert/update/delete performance of the multi-column index, without having to be concerned with the effect of the ordering of the multi-column index on the ordering in which the dimension tables are joined.

Figure 3B:
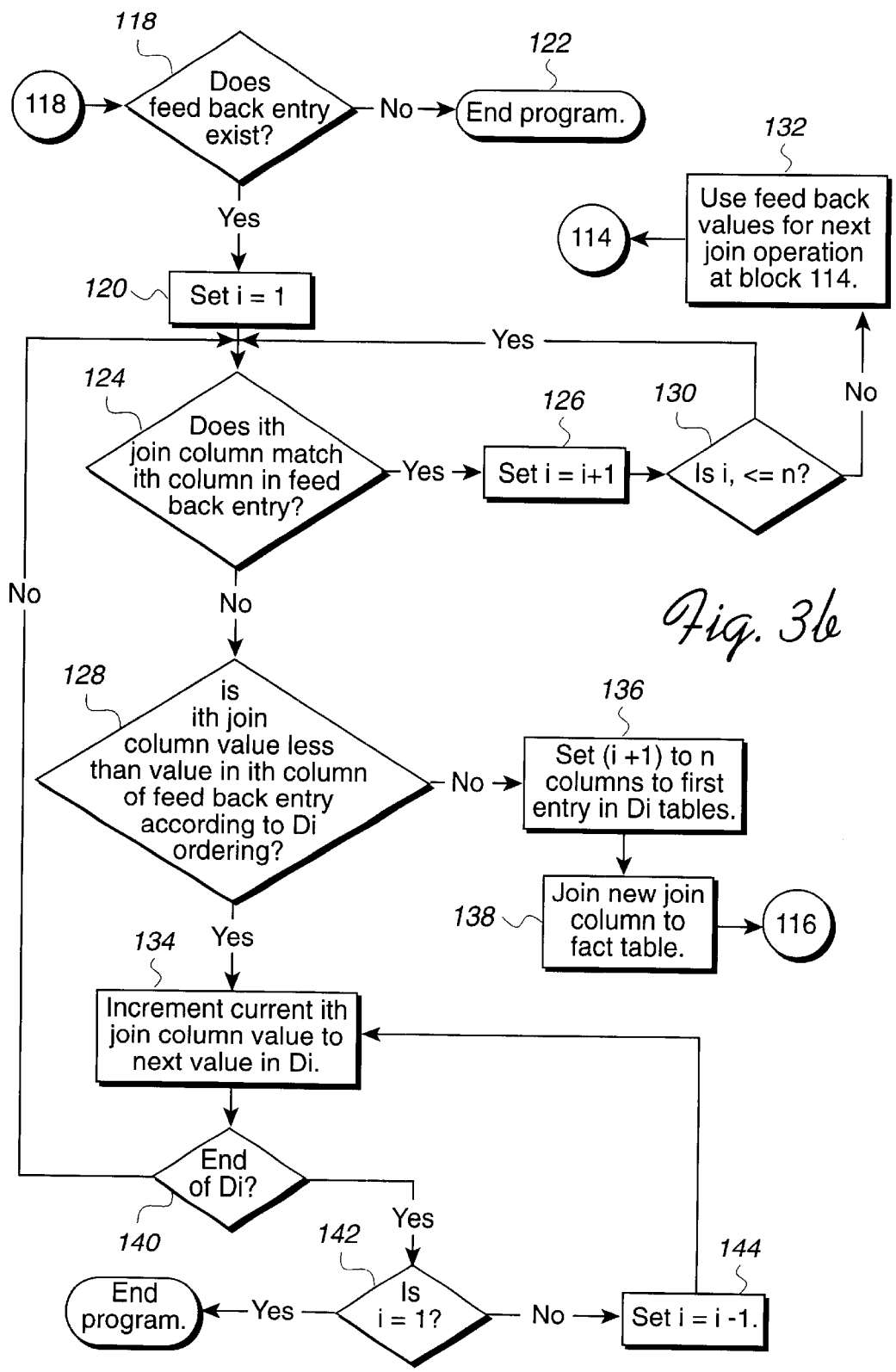

In implementing the logic of FIGS. 3a, b, the query engine 20 may maintain position indicators, each pointing to a row in the primary key columns of the dimension tables. In such case, the join columns would be determined from the values at the dimension rows addressed by the position indicators. The pointers may move downward on the dimension table to point to the next entry in the table. If there are no further entries in a dimension table to consider, then the pointer may be positioned to the top of the dimension table to the first entry. For instance, to perform the step at block 132 in FIG. 3b to move to the next entry, the query engine 20 would increment the position indicator for the Ith dimension ($D_i$) to point to the next row in the primary key column of $D_i$. When setting the join columns to the first entry in the dimension tables $D_i$ at block 138, the query engine 20 would move the position indicator to point to the first row in the ith dimension table. In this way, the pointers to the entries in the dimension tables are manipulated to determine the search key values. Those skilled in the art will recognize alternative programming techniques for implementing the logic of FIGS. 3a, b.

Performing Join Operations when Duplicate Values are Present in Dimension Tables A situation may occur where there are duplicate values in the dimension tables on the join columns or leading column. Such rows in the dimension table with the same value on the primary key column may have a different attribute value on some other column. For instance, a city location, such as Los Angeles, may be in the geographic dimension 8 twice, once for a region value 40 of the West Coast and another for a region value 40 of Southern California. In such case, the join operation should be performed for a join column value of Los Angeles two times. When the joined dimension tables are joined to the fact table, the join operation of the concatenated dimension rows including Los Angeles and the fact table 10 will produce the same results an extra time for each instance a join column value is repeated in the dimension table. Thus, including two rows of the geographic dimension table 8 with a value of Los Angeles, will require the same join results to be returned from the fact table twice, once for each instance of Los Angeles in the geographic dimension table 8.

The repositioning logic of FIGS. 3a, b to advance or skip concatenated rows from the joined dimension table space would skip through any duplicate values in the concatenated rows that would form an equijoin with the fact table. For instance, suppose the product dimension table 6 had the following values (coat, detergent, hat, shirt, coat, shoe), with the value of coat repeated twice. Perhaps coat is found in two product classes 32, which results in two rows of coat in the product dimension table 6. With reference to FIG. 4, the search criteria comprises a date of Jan. 31, 1997 and product shoe. In this example, assume the product dimension table values used in the join operation include one duplicate value for shoe. The join operation on the dimension tables would join:

| 1/31/97 | x | Chicago, Detroit, ... San Jose ... San Simeon | x | Shoe, Shoe |
|---------|---|----------|---|-------|

This would produce duplicate concatenated rows with duplicate values of every combination of shoe and each city location. Thus, it is desired to return fact table entries in the join operation having a date of Jan. 31, 1997 and a product shoe twice, once for each value of shoe in the product dimension table. However, upon receiving the feed back key (Jan. 31, 1997, Coat, Detroit) 204 after receiving the first matching (Jan. 31, 1997, Chicago, Shoe) entry 202, the logic of FIGS. 3a, b would select the next concatenated row from the joined dimension table values that match the search criteria on Jan. 31, 1997 and shoe as (Jan. 31, 1997, Detroit, Shoe). Thus, the logic of FIGS. 3a, b, would only return the join result of (Jan. 31, 1997, Chicago, Shoe) 202 from the fact table 200 once, because the logic would not perform a join operation with the duplicate concatenated row of (Jan. 31, 1997, Chicago, Shoe) twice, as the logic would skip to join the concatenated row of (Jan. 31, 1997, Detroit, Shoe) with the fact table 200 and proceed further through the space formed by joining the dimension table rows that satisfy the search criteria. There is thus a need to modify the logic of FIGS. 3a, b when there are duplicate rows in the dimension tables used in the join operations.

Figure 5:
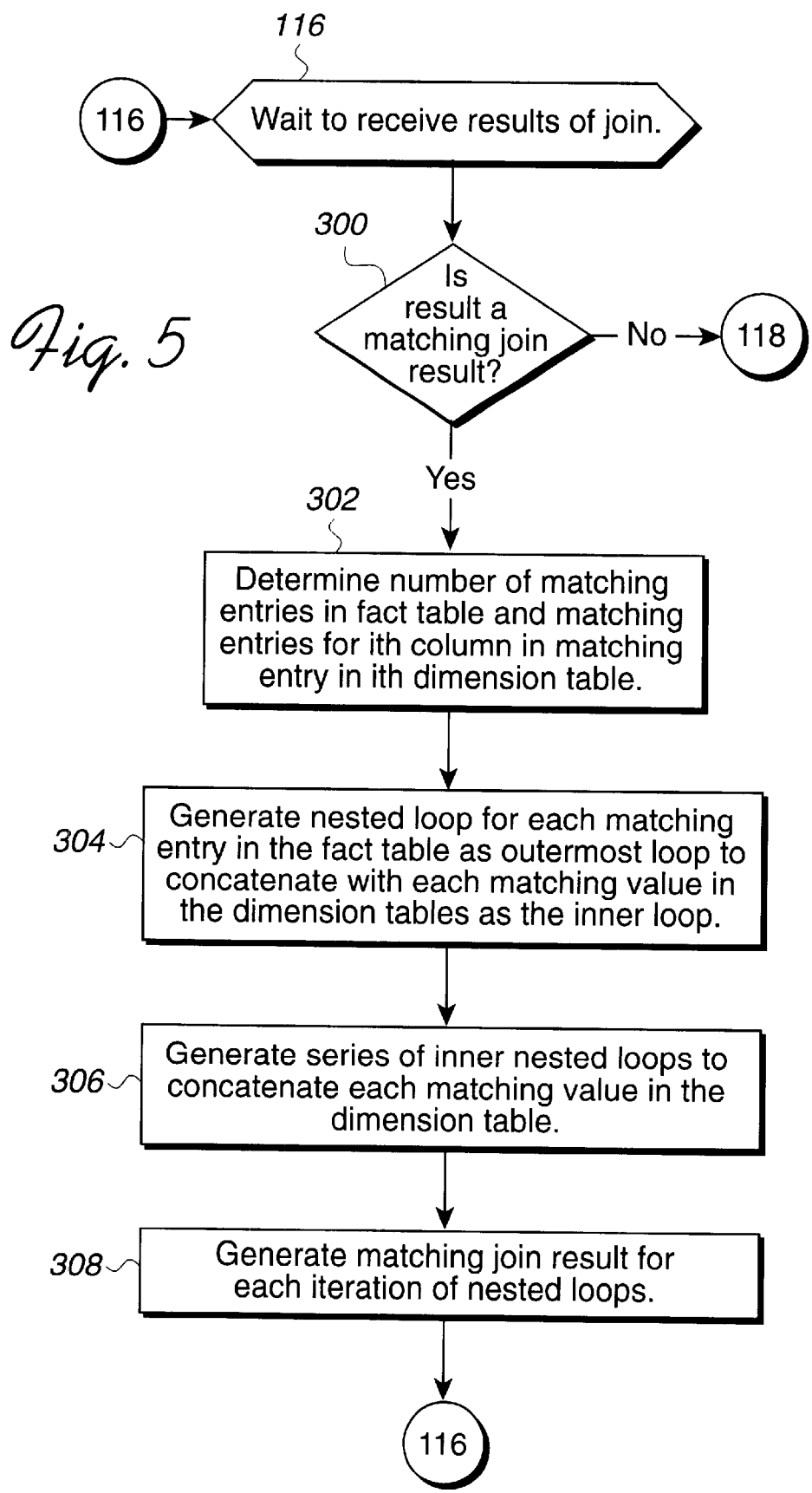
FIG. 5 illustrates logic to process duplicate values in dimension tables and the fact table in accordance with preferred embodiments of the present invention.

FIG. 5 illustrates logic used to handle duplicate values in the dimension tables when a match occurs. With the logic of FIG. 5, the query engine 22 must repeat a join operation after a join result returning a matching entry in the fact table to retrieve further matching entries in the fact table. A join operation may return either a matching entry in the fact table, i.e., the result of the join operation, or a feed back entry that differs from the concatenated row of the dimension tables used in the join entry and follows the concatenated row according to the ordering of the fact table. FIG. 5 comprises a modification to what occurs after a matching entry is received at block 116 in response to a join operation. After a result is returned at block 116 in response to a join operation, the query engine 20 determines (at block 300) whether the result is a matching join result. If the returned entry is a feed back entry, then the search engine proceeds to block 118 to process the feed back entry to determine the next concatenated row to join with the fact table.

If the returned entry is a match in the fact table, then the search engine 20 proceeds to blocks 302 and 304 to generate nested loops for each matching value in the dimension columns and each matching entry in the fact table. For instance, if the join operation which produced a matching entry in the fact table is on (Jan. 31, 1997, Chicago, Shoe), then nested loops would be generated for each matching entry of Jan. 31, 1997, Chicago or Shoe in the dimension tables. Further, for the matching entries in the fact table, nested loops would be generated on these duplicate values too, to determine all duplicate combinations. A matching value in the dimension tables refers to a value in the join column of the dimension table that matches the corresponding value for that column in the matching entry in the fact table. Thus, a matching entry from the fact table has join column values that match the corresponding join column values in the dimension tables. Matches following the first matching value and entry are duplicate values and entries.

At block 302, the query engine 20 determines the number of matching entries in the fact table and the number of matching values in the dimension tables. The concatenation of the matching values in the dimension tables and matching entries in the fact table form the equijoin result. The query engine (at block 304) then generates a nested loop to iterate for each matching entry in the fact table, i.e., using the fact table as the outermost table, to concatenate with the matching values in the dimension tables, which are the inner tables in the nested loops. The query engine 20 then generates a series of nested loops on the dimension tables, which are the inner loop to the fact table, to concatenate each matching value in the dimension tables. Upon sequencing through these nested loops, the query engine 20 generates (at block 308) a matching join result for each iteration of the nested loops. In preferred embodiments, the query engine 20 generates the matching fact table entries from memory instead of performing the fetch operation to access the fact table entry from storage when the fact table is the outermost table. The duplicate row of the fact table does not need to be fetched when performing the join operation as the outermost fact table entry remains the same during the nested loop join operations. After generating the entry from the fact table for each possible combination of the duplicate values in the different dimension tables and entries in the fact table, the query engine 20 proceeds to block 116 to return the matching entries.

The logic of FIG. 5 thus generates a result for each combination of the matching entries in the fact table and matching values in the dimension tables. For instance, if there are two matching entries in the fact table, i.e., one duplicate value, and 3 matching entries, i.e., two duplicate values, in the dimension tables, then the nested loop would iterate 2×3×3×3 or 54 times, which comprises the total possible combinations of the matching entries. If there was only one matching entry and no duplicate values in any of the fact or dimension tables, then only one matching result would be generated. By using the fact table as the outermost table in the nested loops, the fact table, or matching entries, are only scanned once, i.e., for each matching entry in the fact table. Each matching entry in the fact table is then concatenated with the concatenations formed by the nested loop operations through the dimension tables.

In alternative embodiments, the dimension tables and fact table may be concatenated in any order. For instance, the fact table may be at the innermost location of all nested loops and one of the dimension tables the outermost table of all nested loops. In such case, the fact table would be accessed multiple times, for each iteration of matching entries in dimension tables that have an outer position with respect to the fact table. For instance, assume the above example where there are two matching entries in the fact table, i.e., one duplicate value, and 3 matching entries, i.e., two duplicate values, in the dimension tables. If the fact table in the example is the innermost loop, then the fact table will be accessed 3×3×3 or 27 times, for each iteration of the dimension tables in preceding nested loops. Further, the matching entries of the dimension tables may be concatenated in any order, or according to a join order for joining the dimension tables and fact tables. Methods for determining join orders for dimension table are known in the art. The related and co-pending and pending U.S. Ser. No. 09/340,352 field Jun. 25, 1999 patent application, entitled "Method, System, and Program for Determining the Join Ordering of Tables in a Join Query," having and which was incorporated herein by reference above in its entirety, describes further methods for determining join orders.

The logic of FIG. 5 generates a conditional nested loop on each matching entry in the dimension tables and fact table. This insures that no duplicate values are bypassed by the repositioning logic of FIGS. 3a, b as nested loops are generated to return all join results, including join results formed by the concatenation of the duplicate values. With the preferred logic of FIG. 5, for each additional concatenation formed as a result of the generated nested loops, the fetch operation is not performed again for the duplicate values. Instead, the matching entry determined from the first join operation is provided from memory without the query engine 20 having to scan the fact table again to produce the same answer. Thus, with the logic of FIG. 5, if there were $m_i$ instances in column i or $D_i$ of the matching value and n instances of the matching entry in the fact table, then the number of join results, or matching entries, that would be generated during the iteration of the nested loops would be $$\prod_{i=1}^{m} m_i \cdot n$$

Each $m_i$ is at least equal to one and exceeds one for every additional duplicate value in the ith column or $D_i$.

Having the fact table as the outermost table is more suited for situations where there is an index on the fact table, such as a B-tree index, where a single operation searches the tree from beginning to end. In such case, nested loops are generated to produce the resulting join match for each iteration of the loop. The logic of FIG. 5 conserves I/O and searching resources by avoiding having to search the table from the beginning for each iteration of the nested loop structure and instead just return the matching entry, which the search engine 20 previously determined before starting the nesting loop process.

Placing the fact table innermost with respect to one or more dimension tables is particularly suited for situations where there is no index on the fact table and the fact table is instead ordered on the join columns. In such case, after performing a join operation, the query engine 20 can proceed back to the top of the fact table at block 114 to perform another join operation for the additional instance of a duplicate value in the dimension table. For each iteration of the loops for which the fact table has the inner table, the query engine 20 would proceed to the top of the fact table to again concatenate the matching entries of the fact table with the dimension tables. In preferred embodiments, when the fact table is the innermost table and not in an index form, then the query engine 20 would maintain the location of the first matching entry in the fact table. In this way, when performing the join of the outer dimension table with the fact table, the fact table is not scanned to find the matching entry. Instead the pointer is used to locate where the matching entries begin in the fact table. This avoids the need to scan through the entire fact table to locate the first matching entry when going through iterations of the loop for dimension table matching values that are outer with respect to the fact table.

In alternative embodiments, the fact table may be placed as the inner most loop even when there is an index on the fact table and the fact table may be placed as the outer most loop when there is no index on the fact table.

Figure 6:
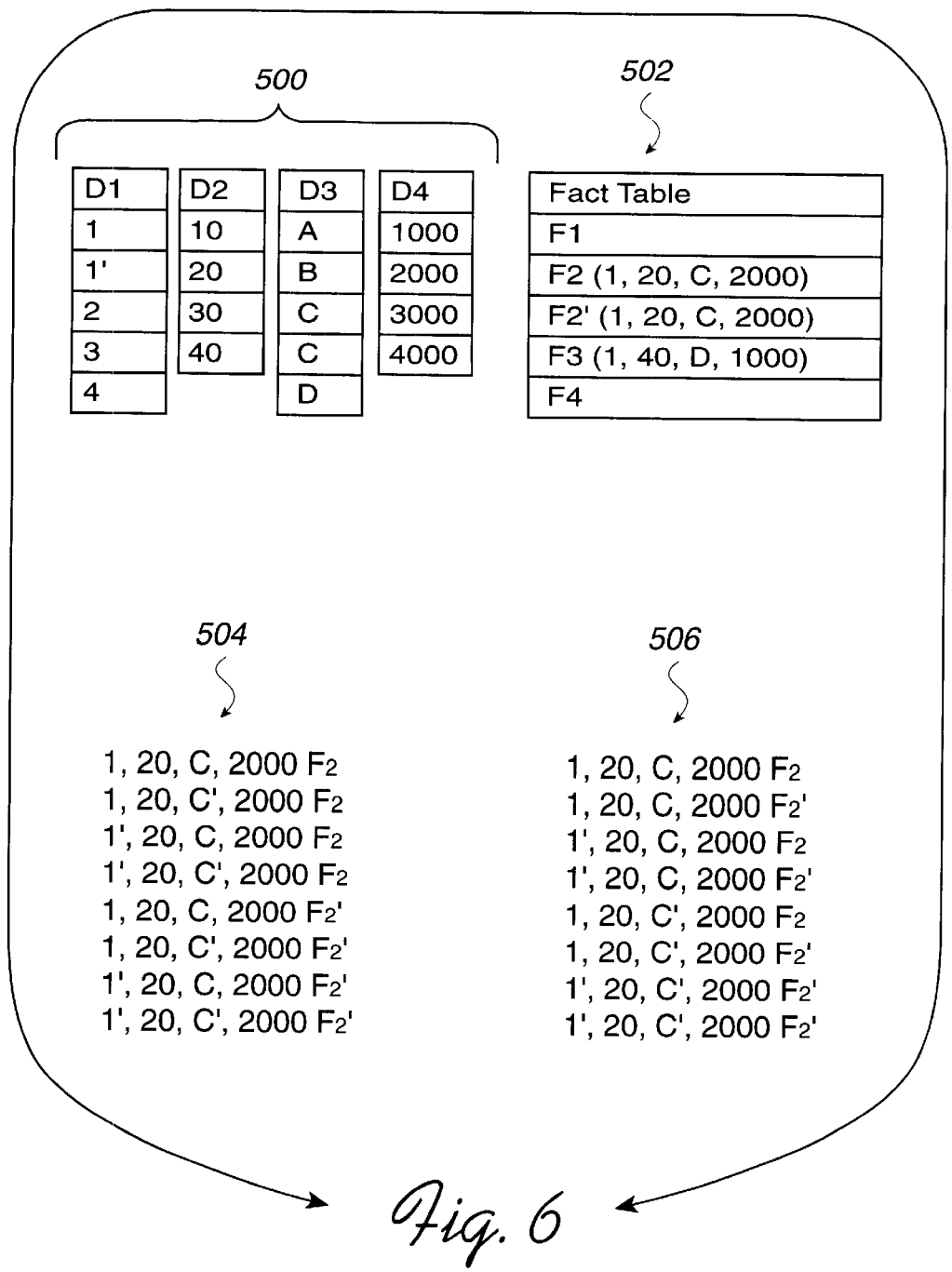
FIG. 6 illustrates an example of dimension tables and fact tables with duplicate values and an example of how the preferred logic processes such duplicate values.

FIG. 6 illustrates four dimension tables $D_1$, $D_2$, $D_3$, and $D_4$ 500 and a fact table 502 of entries Fi having possible values. Assume, $F_2$ and $F_2'$ have join column values of 1, 20, C, 2000 and $F_3$ of 1, 40, D, 1000. The logic of FIGS. 3a, b alone would only return matches from the fact table for the first concatenation of 1, 20, C, 200 twice for $F_2$ and $F_2'$, and then return $F_3$ or 1, 40, D, 1000 as feed back. FIGS. 3a, b alone would not return the matching entries of $F_2$ and $F_2'$ for the duplicate values in the dimension tables $D_1$ and $D_3$ of 1 and 1' and C and C'. The logic of FIG. 5 would, upon receiving the first match at $F_2$, form a first nested loop for each matching entry in the fact table to join with each instance of $D_1=1$ and then another inner nested loop performing an iteration for each additional value of $D_3=C$. Each of these nested loops would run two times, generating the matching result of $F_2$ four times and then generate the nested loops again for $F_2'$ and repeated results. These results of the application of the logic of FIG. 5 is illustrated at 504 in FIG. 7. As can be seen, from the results of 504, the fact table is the outermost table, wherein a matching entry value in the fact table is then concatenated with all the different combinations of the dimension tables.

Thus, the different placement of the fact table in the nested loops achieves the same result to generate further matching results when there are duplicates of a value in the dimension tables. The preferred logic of FIG. 5 integrates with the repositioning logic of FIGS. 3a, b to avoid having to form the Cartesian product of the duplicate values with the other dimension table columns to generate the complete space of dimension table rows, including duplicate rows for duplicate values. The logic of FIG. 5 provides a modification to the repositioning logic of FIGS. 3a, b to provide all matching results when there are duplicate values in the dimension and fact tables.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to a query engine that performs the steps of generating a query and searching the fact table and dimension tables. However, in further embodiments, the functions performed by the search engine may be performed with various components of a database management systems (DBMS) program.

Preferred embodiments were described with respect to a star join operation arrangement where dimension tables are joined to a fact table. However, the preferred logic may apply to any arrangement where there is a multi-column table with foreign key columns and multiple satellite tables that have as a primary key columns at least one of the foreign key columns of the primary table to maintain referential integrity between the multi-column table and satellite tables. Preferred embodiments are not limited solely to the star join arrangement. Further, the search criteria may include columns of the dimension table other than the primary key column or include the primary key column.

Those skilled in the art will appreciate that the searching algorithm of the preferred embodiments may apply to search operations performed with respect to any type of data structures comprised of columns or rows or a list of records that have values for common fields of information. The preferred embodiment search techniques are not limited to tables or other database structures, such as tables, indexes or other combinations of ordered data that must be considered.

The algorithm of the preferred embodiments was described as having particular steps in a particular order. However, alternative algorithms in accordance with the invention may include modifications, deletions, and/or additions to the steps described in the preferred embodiment algorithms. Such modified algorithms would still produce more efficient searches on missing columns than current methods for searching missing columns in multi-column indexes.

Preferred embodiments were described with respect to performing a nested loop join for each matching entry to generate matching results for duplicate values in the fact and dimension tables. However, in alternative embodiments, any join method known in the art may be used, e.g., sort merge join, hash joins, etc.

Preferred embodiments were described with respect to situations where the satellite table included a single join column, in which there could be duplicate values. However, a satellite table may include multiple join columns. In such case, the query engine would consider the concatenation of the join columns within the satellite table when determining matching values, i.e., matching values are considered across join columns within a satellite table.

In summary, preferred embodiments disclose a method, system, and program for performing a join operation on a multi-column table and at least two satellite tables having a join condition. Each satellite table is comprised of multiple rows and at least one join column. The multi-column table is comprised of multiple rows and at least one column corresponding to the join column in each satellite table. A join operation is performed on the rows of the satellite tables to generate concatenated rows of the satellite tables. One of the concatenated rows is joined to the multi-column table and a returned entry from the multi-column table is received. A determination is then made as to whether the returned entry matches the search criteria. If so, a determination is made as to whether one of the satellite tables has duplicates of values in the join column of the returned matching entry or the multi-column table has duplicate entries in the join columns. Returned matching entries are generated for each duplicate value in the satellite tables and duplicate entry in the multi-column table.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing a join operation on a multi-column table and at least two satellite tables having a join condition, wherein each satellite table is comprised of multiple rows and at least one join column and wherein the multi-column table is comprised of multiple rows and at least one column corresponding to the join column in each satellite table, comprising:

performing a join operation on the rows of the satellite tables to generate concatenated rows of the satellite tables;

joining one of the concatenated rows to the multi-column table;

receiving a returned entry from the multi-column table;

determining whether the returned entry matches the search criteria;

determining, after determining that the returned entry matches the search criteria, whether one of: (i) the satellite tables has duplicates of values in the join column of the returned matching entry or (ii) the multi-column table has duplicate entries in the join columns; and generating the returned matching entry for each one of: (i) the duplicate values in one of the satellite tables or (ii) the duplicate entries in the multi-column table.

2. The method of claim 1, further comprising determining whether both the satellite tables have duplicate values and the multi-column table has duplicate entries, wherein generating the returned matching entries further comprises:

determining all possible combinations of the number of matching entries in the multi-column table and the matching join column values in the satellite tables; and returning the matching entry for each possible combination of the matching entries and matching values.

3. The method of claim 2, wherein determining all the possible combinations comprises generating at least one nested loop to iterate through the matching values in each determined satellite table and all the matching entries in the multi-column table and returning the matching entry for each iteration of each of the nested loops.

4. The method of claim 3, wherein the join result of the matching entries from the multi-column table and matching values from the satellite tables is returned during each iteration of the nested loop from memory.

5. The method of claim 3, wherein the multi-column table is at an outermost position in the nested loop with respect to all the matching values of the satellite tables, and wherein, for each matching entry in the multi-column table, the nested loop is iterated through each matching value in the satellite tables.

6. The method of claim 5, wherein using the multi-column table in the join operation comprises using an index on the multi-column table having entries stored in a tree structure.

7. The method of claim 3, wherein the multi-column table has an inner position with respect to at least one satellite table in the nested loops.

8. The method of claim 7, wherein the multi-column table is ordered on the join columns.

9. The method of claim 8, further comprising:
   maintaining a pointer to a first matching entry in the multi-column table; and
   processing the pointer to access the first matching entry when performing the iterations to concatenate the dimension tables and multi-column table.

10. A system for performing a join operation on a multi-column table and at least two satellite tables having a join condition, comprising:
    a computer;
    a memory area accessible to the computer including at least two satellite tables, wherein each satellite table is comprised of multiple rows and at least one join column and a multi-column table comprised of multiple rows and at least one column corresponding to the join column in each satellite table;
    program logic executed by the computer, comprising:
      (i) means for performing a join operation on the rows of the satellite tables to generate concatenated rows of the satellite tables;
      (ii) means for joining one of the concatenated rows to the multi-column table;
      (iii) means for receiving a returned entry from the multi-column table;
      (iv) means for determining whether the returned entry matches the search criteria;
      (v) means for determining whether one of: (a) the satellite tables has duplicates of values in the join column of the returned matching entry or (b) the multi-column table has duplicate entries in the join columns after determining that the returned entry matches the search criteria; and
      (vi) means for generating the returned matching entry for each one of: (a) the duplicate values in one of the satellite tables or (b) the duplicate entries in the multi-column table.

11. The system of claim 10, wherein the program logic further comprises means for determining whether both the satellite tables have duplicate values and the multi-column table has duplicate entries, and wherein the program logic for generating the returned matching entries further comprises:
    means for determining all possible combinations of the number of matching entries in the multi-column table and the matching join column values in the satellite tables; and
    means for returning the matching entry for each possible combination of the matching entries and matching values.

12. The system of claim 11, wherein the program logic for determining all the possible combinations comprises means for generating at least one nested loop to iterate through the matching values in each determined satellite table and all the matching entries in the multi-column table and returning the matching entry for each iteration of each of the nested loops.

13. The system of claim 12, wherein the join result of the matching entries from the multi-column table and matching values from the satellite tables is returned during each iteration of the nested loop from memory.

14. The system of claim 12, wherein the program logic for generating each nested loop comprises:
    means for using the multi-column table at an outermost position in the nested loop with respect to all the matching values of the satellite tables;
    means for performing an iteration of the nested loop through each matching value in the satellite tables for each matching entry in the multi-column table.

15. The system of claim 14, wherein an index on the multi-column table has entries stored in a tree structure, further comprising program logic for using the index in the join operation.

16. The system of claim 12, wherein the multi-column table has an inner position with respect to at least one satellite table in the nested loops.

17. The system of claim 16, wherein the multi-column table is ordered on the join columns.

18. The system of claim 17, wherein the program logic further comprises:
    means for maintaining a pointer to a first matching entry in the multi-column table; and
    means for processing the pointer to access the first matching entry when performing the iterations to concatenate the dimension tables and multi-column table.

19. An article of manufacture for use in programming a computer to perform a join operation on a multi-column table and at least two satellite tables having a join condition, wherein each satellite table is comprised of multiple rows and at least one join column and wherein the multi-column table is comprised of multiple rows and at least one column corresponding to the join column in each satellite table, the article of manufacture comprising computer useable media including at least one computer program embedded therein that is capable of causing the computer to perform: performing a join operation on the rows of the satellite tables to generate concatenated rows of the satellite tables;
    joining one of the concatenated rows to the multi-column table;
    receiving a returned entry from the multi-column table;
    determining whether the returned entry matches the search criteria;
    determining whether one of: (i) the satellite tables has duplicates of values in the join column of the returned matching entry or (ii) the multi-column table has duplicate entries in the join columns after determining that the returned entry matches the search criteria; and
    generating the returned matching entry for each one of: (i) one of the satellite tables or (ii) the duplicate entries in the multi-column table.

20. The article of manufacture of claim 19, further comprising determining whether both the satellite tables have duplicate values and the multi-column table has duplicate entries, wherein generating the returned matching entries comprises:

determining all possible combinations of the number of matching entries in the multi-column table and the matching join column values in the satellite tables; and returning the matching entry for each possible combination of the matching entries and matching values.

21. The article of manufacture of claim 20, wherein determining all the possible combinations comprises generating at least one nested loop to iterate through the matching values in each determined satellite table and all the matching entries in the multi-column table and returning the matching entry for each iteration of each of the nested loops.

22. The article of manufacture of claim 21, wherein the join result of the matching entries from the multi-column table and matching values from the satellite tables is returned during each iteration of the nested loop from memory.

23. The article of manufacture of claim 21, wherein the multi-column table is at an outermost position in the nested loop with respect to all the matching values of the satellite tables, and wherein, for each matching entry in the multi-column table, the nested loop is iterated through each matching value in the satellite tables.

24. The article of manufacture of claim 23, wherein using the multi-column table in the join operation comprises using an index on the multi-column table having entries stored in a tree structure.

25. The article of manufacture of claim 21, wherein the multi-column table has an inner position with respect to at least one satellite table in the nested loops.

26. The article of manufacture of claim 25, wherein the multi-column table is ordered on the join columns.

27. The article of manufacture of claim 26, further comprising:

maintaining a pointer to a first matching entry in the multi-column table; and processing the pointer to access the first matching entry when performing the iterations to concatenate the dimension tables and multi-column table.

\* \* \* \* \*

UNITED STATES PATENT AND TRADEMARK OFFICE
CERTIFICATE OF CORRECTION

PATENT NO. : 6,374,235 B1
DATED : April 16, 2002
INVENTOR(S) : Stephen Yao Ching Chen et al.

It is certified that error appears in the above-identified patent and that said Letters Patent is hereby corrected as shown below:

Column 1,
Line 16, delete "Ser. No. 09/344,731" and insert -- Ser. No. 09/344,727 --
Line 23, delete "Ser. No. 09/344,727" and insert -- Ser. No. 09/340,352 --
Line 28, delete "Ser. No. 09/340,352" and insert -- Ser. No. 09/340,084 --

Column 16,
Line 60, after "(i)" insert -- the duplicate values in --

Signed and Sealed this

Twenty-sixth Day of July, 2005

JON W. DUDAS
*Director of the United States Patent and Trademark Office*